United States Patent [19]

Miyake

[11] Patent Number: 4,472,044
[45] Date of Patent: Sep. 18, 1984

[54] SEMICONDUCTOR INTEGRATION CIRCUIT

[75] Inventor: Toshihide Miyake, Kashiwara, Japan

[73] Assignee: Sharp Kabushiki Kaisha, Osaka, Japan

[21] Appl. No.: 444,192

[22] Filed: Nov. 24, 1982

[30] Foreign Application Priority Data

Nov. 26, 1981 [JP] Japan ............................. 56-191345

[51] Int. Cl.$^3$ ............................................ G03B 7/083
[52] U.S. Cl. .................................... 354/459; 354/484
[58] Field of Search ................ 354/51, 60 R, 459, 484

[56] References Cited

U.S. PATENT DOCUMENTS

| | | | |
|---|---|---|---|
| 3,971,045 | 7/1976 | Nanba et al. | 354/60 R |
| 3,978,498 | 8/1976 | Nakamura et al. | 354/60 R |
| 4,085,411 | 4/1978 | Genesi | 354/51 |
| 4,100,407 | 7/1978 | Takahashi | 354/60 R |
| 4,104,547 | 8/1978 | Frederiksen et al. | 354/51 |
| 4,216,379 | 8/1980 | Genesi | 354/51 |
| 4,318,600 | 3/1982 | Miyake | 354/60 R |

Primary Examiner—Russell E. Adams
Attorney, Agent, or Firm—Birch, Stewart, Kolasch & Birch

[57] ABSTRACT

A semiconductor switch circuit includes a switching transistor circuit having switching transistors connected in two stages, a follower circuit comprising a condenser for integration, a power source circuit, the switching transistor circuit connected between the follower circuit and the power source circuit, and a switching transistor connected as the second stage of the switching transistor, circuit such that each of the base and the emitter of the switching transistor is connected to a resistor and the resistor is connected to an output terminal of the follower circuit for generating an output whose level equals the level of the collector of the switching transistor.

16 Claims, 1 Drawing Figure

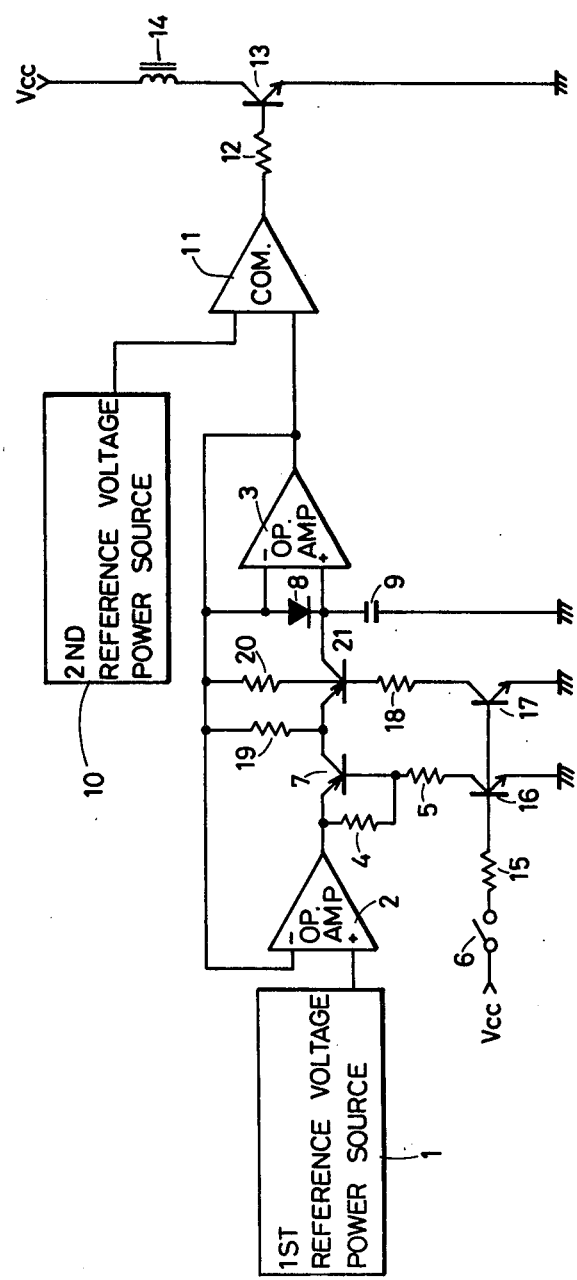

SEMICONDUCTOR INTEGRATION CIRCUIT

BACKGROUND OF THE INVENTION

The present invention relates to a semiconductor switch circuit and, more particularly, to an integrated circuit suitable for a timer of the type which measures time by charing a condenser with a very small current.

As an example of such a timer, an electronic shutter control circuit is presented. The electronic shutter control circuit has evolved so as to provide a semiconductor switch circuit for controlling the opening and closing of a shutter, to set integration starting conditions for adopting an appropriate amount of exposure light, and starting to integrate time.

However, since the electronic shutter control circuit must be driven with a very small current, MOS transistor switches are not suitable for such a circuit because of their inherent leakage current. Bipolar transistors are also not suitable for such a circuit because their saturation voltage remains between the collector and the emitter of each of the transistors upon conductive conditions. Thus, the accurate operation of the switch circuit could not be expected.

SUMMARY OF THE INVENTION

Accordingly, it is an object of the present invention to provide an improved semiconductor switch circuit.

It is another object of the present invention to provide an improved integration circuit suitable for a timer of the type which measures time by charging a condenser with a small current.

It is a further object of the present invention to provide an improved integration circuit suitable for an electronic shutter control circuit for a camera.

Briefly described, in accordance with the present invention, a semiconductor switch circuit comprises a switching transistor circuit including switching transistors connected in two stages, a follower circuit comprising a condenser for integration, a power source circuit, the switching transistor circuit connected between the follower circuit and the power source circuit, and a switching transistor connected at the second stage to the follower circuit in the switching transistors, such that each of the base and the emitter of the switching transistor is connected to a resistor and the resistor is connected to an output terminal of the follower circuit for generating an output whose level equals the level of the collector of the switching transistor.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

The single FIGURE of drawings shows a block diagram of a semiconductor integration circuit of the present invention.

DESCRIPTION OF THE INVENTION

The semiconductor integration circuit of the present invention is described as related to a semiconductor integration circuit adapted to an electronic shutter control circuit although not limited to such a semiconductor integration circuit.

With reference to the FIGURE, the integration circuit of the present invention comprises a first reference voltage power source 1, a second reference voltage power source 10, two operational amplifiers 2 and 3, a comparator 11, two PNP switching transistors 7 and 21, a condenser 9, six resistors 4, 5, 12, 15, 18, 19 and 20, a trigger switch 6, a photo conductor 8, two NPN transistors 16 and 17, an electromagnet 14, and a transistor 13.

The photo conductor 8 is coupled across a positive input terminal and a negative input terminal of the first operational amplifier 3. The output terminal of the operational amplifier 3 and the output terminal of the first reference voltage power source 1 are connected to the negative and positive input terminals of the second operational amplifier 2. The first reference voltage power source 1 functions to provide an output bearing a predetermined voltage level.

The first operation amplifier 3 functions to reduce error due to a saturation voltage remaining within the PNP switching transistor 7. The second operational amplifier 2 comprises bipolar transistors. This amplifier 2 functions to compensate for error due to an offset voltage of the first operational amplifier 3.

The first operational amplifier 3 is for integration in the electronic shutter control circuit. This amplifier 3 comprises MOS transistors. The photo conductor 8 such as a photo diode is provided for detecting the brightness of an object to be imaged. The condenser 9, provided for integration, is connected between the positive input terminal of the amplifier 3 and ground.

The base and the emitter (via the resistor 4) of the PNP switching transistor 7 are connected to the output terminal of the second operational amplifier 2. The resistor 4 functions to reduce a collector current of the transistor 7 and to discharge current stored in the transistor 7 in order to improve switching speed because the resistor 4 shortcircuits the base and the emitter of the transistor 7.

The trigger switch 6 is actuated to start integration. The switch 6 is operated with relation to the desired operation of a shutter. Before the shutter is opened, the trigger switch 6 is closed.

The output terminal of the integration operational amplifier 3 is connected to the negative input terminal of this amplifier 3 and an input terminal of the comparator 11. The comparator 11 compares the output of the amplifier 3 and the output of the second reference voltage power source 10, which is also applied to the other input terminal of the comparator 11. The power source 10 generates an output voltage for detecting the degree of integration. The comparator 11 develops comparison results to be applied to the transistor 13 via the resistor 12 so as to operate the electromagnet 14 for controlling the operation of the shutter.

Since the output of the integration operation amplifier 3 is applied to the negative input terminal of the operational amplifier 2 to control on and off operations of the PNP transistor 7 with the output of the operational amplifier 2, errors due to the saturation voltage remaining in the transistor 7 may be compensated for. Since the operational amplifier 2 comprises bipolar transistors, errors due to the offset voltage of the operational amplifier 3 may also be compensated.

The two PNP transistors 7 and 21 are connected between the operational amplifiers 2 and 3 for switching. The PNP transistor 21 is connected for preventing the generation of a leakage current caused when the switching transistor 7 is made non-conductive. The base and the emitter of the transistor 21 are connected to the output terminal of the operational amplifier 3 through the resistors 19 and 20, respectively. The output level of the amplifier 3 is identical with the voltage level of the collector of the transistor 21.

The base of the switching transistor 7 is connected to the collector of the NPN transistor 16 via the resistor 5. The base of the switching transistor 21 is connected to the collector of the NPN transistor 17 via the resistor 18. The emitters of the NPN transistors 16 and 17 are grounded. The bases of these transistors 16 and 17 are connected to the trigger switch 6 via the resistor 15. Before the shutter is opened, the trigger switch 6 is closed so that a power voltage $V_{CC}$ is applied to the bases of the NPN transistors 16 and 17 to make the PNP switching transistors 7 and 21 conductive.

When the shutter is opened, the trigger switch 6 is opened to make the PNP switching transistors 7 and 21 non-conductive. At the same time, a photo current corresponding to the intensity of incident light is developed across the photo conductor 8. The photo current flows through the condenser 9 to start to integrate time to control the opening of the shutter. The voltage of the condenser 9 develops the output voltage of the first operational amplifier 3 which is applied to the comparator 11.

When the shutter is opened, the PNP switching transistors 7 and 21 are nonconductive. Since the emitter and the base voltages of the transistor 21 at the second stage are maintained identical to the collector voltage of the transistor 21, no potential difference is present between the collector and the emitter, and the collector and the base to make the leak current considerably small.

Therefore, the output of the first operational amplifier 3 applied to the comparator 11 equals the voltage corresponding to the photo current flowing through the condenser 9 from the photo conductor 8. Depending on the intensity of the incident light, accurate shutter operation is established.

According to the present invention, the switching transistors are provided in a two stage connection. Each of the base and the emitter of the switching transistor at the second stage is connected to a resistor. Each resistor is connected to the output terminal of the operational amplifier for generating an output whose level is identical with the level of the collector of the switching transistor at the second stage.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A semiconductor switch circuit comprising:
   a switching transistor circuit comprising switching transistors connected in two stages;
   a voltage follower circuit comprising a condenser for integration;
   a power source circuit;
   the switching transistor circuit being connected between the follower circuit and the power source circuit; and
   a switching transistor having a base, emitter and collector disposed as a second stage of said switching transistor circuit and being connected to the follower circuit, each of the base and the emitter of the switching transistor being connected to a resistor connected in turn to an output terminal of the follower circuit for generating an output whose level equals the level of the collector of the switching transistor.

2. The circuit of claim 1, wherein the follower circuit comprises an operational amplifier whose positive and negative input terminals have an opto electronic device disposed therebetween.

3. The circuit of claim 1, wherein the semiconductor switch circuit functions as a shutter control circuit.

4. The circuit of claim 1, further comprising a trigger switch for starting time integration, the trigger switch being connected to the bases of the switching transistors in the switching transistor circuit through a transistor circuit.

5. The circuit of claim 2, wherein the opto electronic device is a photo diode.

6. A semiconductor switch circuit comprising:
   voltage follower means for monitoring an input signal at an input thereof and producing a follower output corresponding thereto, said voltage follower means having a high input impedance;
   means for compensating for offset errors within said voltage follower means, said means for compensating receiving said follower output at an input thereof and producing a compensation voltage at a compensation output; and
   switching means disposed between said compensation output and said input of said voltage follower means for disabling said means for compensating in a disable mode when monitoring of said input signal is to occur, said switching means when in said disable mode preventing substantially all leakage current from said voltage follower means.

7. The switch circuit of claim 6 wherein said switching means comprises a switching transistor having a base and first and second controlled terminals, said first controlled terminal being connected to said input of said voltage follower means, said second controlled terminal receiving said compensation output when not in said disable mode, said second controlled terminal and said base being biased to said follower output during said disable mode to prevent substantially all said leakage current.

8. A semiconductor switch circuit comprising:
   sensor means for developing a sensor current and producing a follower output corresponding thereto, said voltage follower means having a high input impedance;
   means for compensating for offset errors within said voltage follower means, said means for compensating receiving said follower output at an input thereof and producing a compensation voltage at a compensation output; and
   switching means disposed between said compensation output and said input of said voltage follower means for disabling said means for compensating in a disable mode when monitoring of said condition of interest is to occur, said switching means when in said disable mode preventing substantially all leakage current from said voltage follower means.

9. The switch circuit of claim 8 further comprising integration means for integrating said sensor current to produce said input to said voltage follower means.

10. The switch circuit of claim 8 comprising: integration means for integrating said sensor current to produce said input to said voltage followr means.

11. The switch circuit of claim 10 comprising integration means for integrating said sensor current to produce said input to said voltage follower means.

12. The switch circuit of claim 9 further comprising:
a reference voltage;
means for comparing the output of said voltage follower means to said reference voltage and producing a drive output when said voltage follower output exceeds said reference voltage;
a solenoid; and
means responsive to the drive output of said means for comparing for actuating said solenoid.

13. The switch of claim 8 wherein said sensor means is a photodiode.

14. The switch of claim 9 wherein said sensor means is a photodiode.

15. The switch of claim 8 wherein said switch functions as a shutter control circuit.

16. The switch of claim 12 wherein said switch functions as a shutter control circuit;
said solenoid being operatively connected to a camera shutter for actuation thereof.

* * * * *

UNITED STATES PATENT AND TRADEMARK OFFICE
CERTIFICATE OF CORRECTION

PATENT NO. : 4,472,044
DATED : September 18, 1984
INVENTOR(S) : Toshihide Miyake It is certified that error appears in the above-identified patent and that said Letters Patent is hereby corrected as shown below:

IN THE HEADING OF THE PATENT:

In section [30], change " Nov. 26, 1981" to --Nov. 28, 1981--.

Signed and Sealed this

Twenty-sixth Day of February 1985

[SEAL]

Attest:

DONALD J. QUIGG

Attesting Officer

Acting Commissioner of Patents and Trademarks